United States Patent
Verkila et al.

(10) Patent No.: US 10,171,270 B1
(45) Date of Patent: Jan. 1, 2019

(54) SYSTEMS AND METHODS FOR CORRECTING FOR PRE-CURSOR AND POST-CURSOR INTERSYMBOL INTERFERENCE IN A DATA SIGNAL

(71) Applicant: Cadence Design Systems, Inc., San Jose, CA (US)

(72) Inventors: Satish Anand Verkila, Secunderabad (IN); Vineeth Anavangot, Kochi (IN); Anil Kumar Ankam, Peddapuram (IN)

(73) Assignee: Cadence Design Systems, Inc., San Jose, CA (US)

(*) Notice: Subject to any disclaimer, the term of this patent is extended or adjusted under 35 U.S.C. 154(b) by 0 days.

(21) Appl. No.: 15/849,288

(22) Filed: Dec. 20, 2017

(51) Int. Cl.
*H04L 25/03* (2006.01)
*H04L 1/00* (2006.01)

(52) U.S. Cl.
CPC ...... *H04L 25/03057* (2013.01); *H04L 1/0054* (2013.01); *H04L 2025/0349* (2013.01); *H04L 2025/03503* (2013.01); *H04L 2025/03726* (2013.01)

(58) Field of Classification Search
CPC ............ H04L 25/03267; H04L 25/067; H04L 25/03343; H04L 25/0292; H04L 2025/03808; H04L 7/0058; H04B 10/697; H04B 1/7097; H03H 21/0012
See application file for complete search history.

(56) References Cited

U.S. PATENT DOCUMENTS 9,215,106 B2 * 12/2015 Palusa ............... H04L 25/03057

* cited by examiner

*Primary Examiner* — Rahel Guarino
(74) *Attorney, Agent, or Firm* — Schwegman Lundberg & Woessner, P.A.

(57) ABSTRACT

Various embodiments provide for correcting pre-cursor intersymbol interference (ISI) and post-cursor ISI in a data signal received over a channel. More particularly, some embodiments correct pre-cursor ISI and post-cursor ISI using decision feedback equalization (DFE).

16 Claims, 4 Drawing Sheets

SYSTEMS AND METHODS FOR CORRECTING FOR PRE-CURSOR AND POST-CURSOR INTERSYMBOL INTERFERENCE IN A DATA SIGNAL

TECHNICAL FIELD

Embodiments described herein relate to analog data signal processing and, more particularly, to systems, methods, devices, and instructions for correcting pre-cursor intersymbol interference (ISI) and post-cursor ISI in a data signal received over a communications channel.

BACKGROUND

Within digital systems, analog data signals may be transmitted from a transmitter to a receiver through a channel established therebetween. The communications channel (hereafter, "channel") may comprise any suitable medium that links the transmitter to the receiver, which can include a wired or wireless channel. Depending on the particular application, the channel may be quite lossy, especially for digital systems involving high data transmission speeds, such as over a Universal Serial Bus (USB) channel. Analog data signal losses due to various channel transmission effects, such as interference, attenuation, and delay, may have detrimental effects on a transmitted analog data signal by the time the transmitted analog data signal reaches the receiver. The channel transmission effects can distort the transmitted analog data signal (e.g., cause amplitude or phase distortion), which in turn can result in ISI in the transmitted analog data signal received by the receiver. By ISI, a pulse or other symbol in a transmitted analog data signal, representing the logic state of one data bit at a cursor, may be effectively distorted. ISI generally comprises a pre-cursor component (hereafter, "pre-cursor ISI") that distorts a transmitted analog data signal with respect to one or more data bits preceding a bit corresponding to a cursor of the transmitted analog data signal, and a post-cursor component (hereafter, "post-cursor ISI") that distorts the transmitted analog data signal with respect to one or more data bits succeeding a bit corresponding to a cursor of the transmitted analog data signal.

Traditionally, a receiver can implement decision feedback equalization (DFE) to correct for post-cursor ISI in an analog data signal received at the receiver. Though capable of correcting for post-cursor ISI, conventional DFE cannot correct for pre-cursor ISI in a received analog data signal. Accordingly, a receiver may include a linear equalizer (e.g., by a continuous-time linear equalizer (CTLE)) to correct for pre-cursor ISI in a received analog data signal. Unfortunately, conventional linear equalizers cannot precisely correct for pre-cursor ISI and amplify noise/cross talk in the received analog data signal. Yet another solution to correcting pre-cursor ISI at a receiver can include equalization at a transmitter, but it usually involves large power consumption at the transmitter. Additionally, a pre-cursor equalization may involve additional overhead, such as a backchannel or accurate setting of presets.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
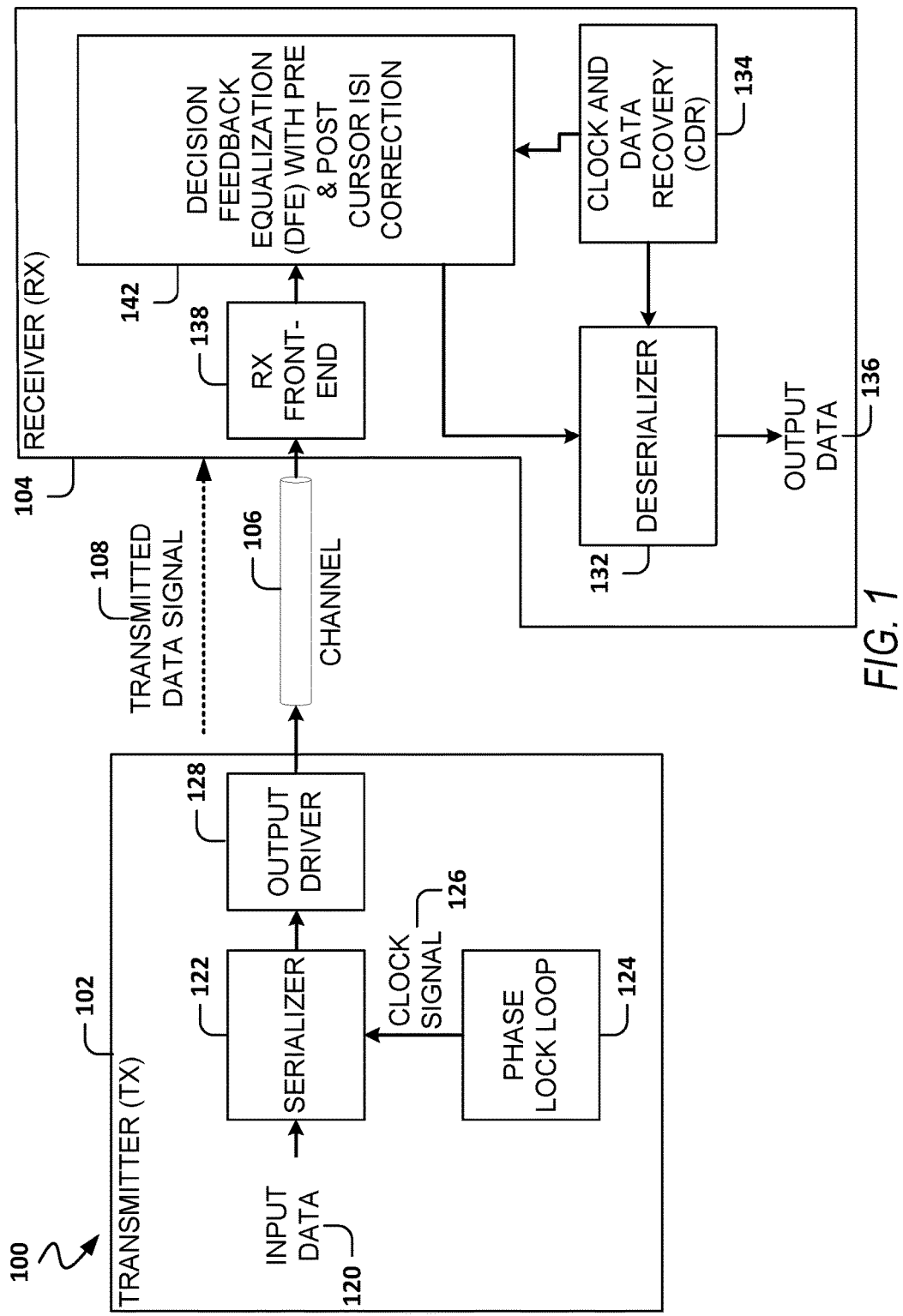
FIG. 1 is a diagram illustrating an example transceiver system that includes correction of pre-cursor and post-cursor ISI, in accordance with some embodiments.

Various embodiments provide for correcting pre-cursor intersymbol interference (ISI) and post-cursor ISI in an analog data signal received over a channel. More particularly, some embodiments correct pre-cursor ISI and post-cursor ISI using decision feedback equalization (DFE).

As used herein, an analog data signal (hereafter, also referred to as "data signal") can comprise a train of electrical pulses (also referred to herein as pulse), where each electrical pulse occupies a discrete amplitude. A cursor can refer to a point of highest amplitude of a pulse response of a data signal carried by a data transmission channel. A clock and data recovery (CDR) process may use a cursor as an ideal sampling location in a data signal for locking on to the data signal. A pre-cursor can refer to an amplitude of a pulse response (in a data signal carried by a data transmission channel) one unit interval (UI) before a cursor. A pre-cursor that is n unit interval(s) (UI(s)) before a cursor may be referred to herein by $\beta_n$ (e.g., $\beta_1$ refers to the first pre-cursor and $\beta_2$ refers to a second pre-cursor). A post-cursor can refer to an amplitude of a pulse response (in a data signal carried by a data transmission channel) after a cursor. A post-cursor that is n unit interval(s) (UI(s)) after a cursor may be referred to herein by $\alpha_n$ (e.g., $\alpha_1$ refers to the first post-cursor and $\alpha_2$ refers to a second post-cursor). A pre-cursor intersymbol interference (ISI) refers to a distortion caused by ISI at a location corresponding to a pre-cursor $\beta$ of a pulse of a data signal. A post-cursor intersymbol interference (ISI) refers to a distortion caused by ISI at a location corresponding to a post-cursor $\alpha$ of a pulse of a data signal. Additionally, a slicer may comprise a comparator circuit According to some embodiments, a DFE includes a main data path (e.g., main DFE path) and an auxiliary data path (e.g., auxiliary DFE path). With respect to retrieving a current data bit (e.g., d[n], data bit d at unit interval n) from a received data signal, the main data path can process the received data signal and cancel out post-cursor ISI for the current data bit based on a previous data bit that precedes the current data bit (e.g., d[n−1], data bit d at unit interval n−1). With respect to retrieving the current data bit from the received data signal, the auxiliary data path can process the received data signal, estimate a next data bit that follows the current data bit (e.g., d[n+1], data bit d at unit interval n+1), and provide the main data path with the estimated next data bit. Based on the estimated next data bit received from the auxiliary data path, the main data path can cancel the pre-cursor ISI for the current data bit. Unlike various embodiments described herein, a conventional DFE does not have a next data bit d[n+1] available when a data signal x[n] is processed by the DFE. According to some embodiments, the next data bit by the auxiliary data path is considered an estimated next data bit because the next data bit comprises a data bit retrieved from the received data signal with post-cursor ISI correction applied but not pre-cursor ISI correction.

During operation, some embodiments begin by generating a first plurality of input data signals based on a data signal x[n] received at a DFE input and based on possible voltage shifts to the data signal x[n] caused by combinations of pre-cursor and post-cursor ISI. Table 1 (below) illustrates the first plurality of input data signals generated by some embodiments for the main data path.

TABLE 1

| |
| --- |
| $x[n] + \alpha + \beta$ |
| $x[n] + \alpha - \beta$ |
| $x[n] - \alpha + \beta$ |
| $x[n] - \alpha - \beta$ |

For some embodiments, each input data signal in the first plurality is generated from the received data signal by using an addition circuit that applies a voltage offset (e.g., positive or negative voltage offset) to the received data signals. According to some embodiments, one of the input signals in the first plurality of input data signals (e.g., Table 1) represents the received data signal x[n] after removal of the pre-cursor ISI and the post-cursor ISI. Various embodiments determine which input signal, in the first plurality of input data signals, provides the correct data bit d[n] (with the pre-cursor ISI and the post-cursor ISI removed) at unit interval n based on the next data bit d[n+1] and the previous data bit d[n−1]. Some embodiments may be implemented using plurality of different slicer (e.g., comparator) thresholds corresponding to pre and post-cursors, thereby obviating the need for a plurality of different voltage shifts.

Relative to a unit interval n, some embodiments estimate the next data bit d[n+1] by delaying the first plurality of input data signals based on x[n] in the main data path while the next data bit d[n+1] is determined by the auxiliary data path using a second plurality of input data signals based on x[n]. In particular, for some embodiments, the first plurality of input data signals is delayed by two unit intervals while the auxiliary data path determines the next data bit d[n+1]. The next data bit d[n+1] determined by auxiliary data path may represent a coarse estimate of the next bit. For various embodiments, the auxiliary data path determines the next data bit d[n+1] by performing a (one-tap) post-cursor ISI correction on the data signal x[n]. According to some embodiments, the post-cursor ISI correction is performed in the auxiliary data path by generating a second plurality of input data signals based on the data signal received x[n] and possible voltage shifts caused to the data signal x[n] caused by possible post-cursor ISI. Table 2 (below) illustrates the second plurality of input signals generated by some embodiments for the auxiliary data path.

TABLE 2

| |
| --- |
| $x[n] + \alpha$ |
| $x[n] - \alpha$ |

For some embodiments, each input data signal in the second plurality of input signals is generated from the received data signal by using an addition circuit that applies a voltage offset (e.g., positive or negative voltage offset) to the received data signals. For each particular input signal in the second plurality of input data signals generated in the auxiliary data path (e.g., two input signals in Table 2), some embodiments convert each particular input signal from an analog signal to a digital data bit (hereafter, referred to as a "data bit") by a slicer in the auxiliary data path. Subsequently, the data bits corresponding to the second plurality of input data signals may then be provided to a multiplexer in the auxiliary data path. According to some embodiments, one of the input signals in the second plurality of input data signals (e.g., Table 2) represents the received data signal x[n] after removal of the post-cursor ISI. Various embodiments determine which input signal, in the second plurality of input data signals, will be used as a coarse estimate of a received bit (d_aux[n]) after post-cursor ISI correction. This coarse estimate can be used as the next bit for pre-cursor ISI correction in the main data path.

Continuing with reference to the main data path, one input signal in the first plurality of input data signals, generated in the main data path, represents the received data signal after removal of the pre-cursor ISI and post-cursor ISI. For each particular input signal in the first plurality of input data signals generated in the main data path (e.g., four input signals in Table 1), some embodiments convert each particular input signal from an analog signal to a data bit by a slicer in the main data path. Subsequently, the data bits corresponding to the first plurality of input data signals may then be provided to a multiplexer in the main data path. However, prior to being provided to the multiplexer, each resulting data bit may be digitally delayed in the main data path, by m unit intervals, using a set of m digital flip flops. Due to this implemented delay of m unit intervals, the output of the multiplexer of some embodiments represents a previous digital bit d[n−m] retrieved from the data signal x at unit interval n−m. For instance, where an embodiment implements a delay of two unit intervals by the two digital flip flops in the main data path, the data bit selected as output for the multiplexer represents a data bit retrieved two unit intervals ago from the data signal x (i.e., d[n−2]). For some embodiments, the data bit retrieved m unit intervals ago (i.e., d[n−m]) from the data signal x and outputted by the multiplexer represents a digital bit with pre-cursor and post-cursor ISI corrected.

For some embodiments, the output of the multiplexer is selected from one of the delayed data bits, resulting from the first plurality of input data signals, received by the multiplexer based on a set of selection inputs to the multiplexer. Further, relative to a unit interval n, for some embodiments, the set of selection inputs of the multiplexer is based on the next data bit d[n+1] provided by the auxiliary data path and based on a previous data bit d[n−1] provided within the main data path. In view of a m unit interval delay implemented within the main data path, the output for the multiplexer may represent a data bit d[n−m] retrieved m unit intervals ago from the data signal x, the next data bit relative to the data bit d[n−m] determined and provided by the auxiliary data path may comprise data bit d[n−m+1] retrieved m−1 unit intervals ago from the data signal x, and the previous data bit relative to the data bit d[n−m] determined within the main data path may comprise data bit d[n−m−1] retrieved m+1 unit intervals ago from the data signal x. Accordingly, where a delay of two unit intervals is implemented by the two digital flip flops in the main data path, for some embodiments, the multiplexer output comprises data bit d[n−2], the next data bit relative to data bit d[n−2] comprises data bit d[n−1], and the previous data bit relative to data bit d[n−2] comprises data bit d[n−3].

Though various embodiments are described herein with respect to correcting for one per-cursor ISI component, such embodiments can be extended to correcting for an additional number of pre-cursor ISI components, such as two, three, or four pre-cursor components.

A receiver may use a DFE of an embodiment to correct for pre-cursor ISI and post-cursor ISI in a received data signal, which, when compared to using a conventional DFE, can improve the receiver's bit error rate (BER) with respect to data bits retrieved from the received data signal. Such a receiver may be part of a Serializer/Deserializer (SERDES) system, which may need to support channels that introduce large pre-cursor ISI into data signals carried by the channels.

With some embodiments, a receiver can correct for pre-cursor ISI and post-cursor ISI without need for equalization at the transmitter, thereby reducing the overall power consumption at the transmitter. With some embodiments, a receiver can correct for pre-cursor ISI and post-cursor ISI without amplification of noise or crosstalk at the receiver, which is typically caused when a CTLE is used to correct for pre-cursor ISI at a receiver. Additionally, with some embodiments, a receiver can correct for pre-cursor ISI and post-cursor ISI using a design that is more compact than solutions that use analog delay to correct for pre-cursor ISI.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example transceiver system 100 that includes correction of pre-cursor and post-cursor ISI, in accordance with some embodiments. According to some embodiments, the transceiver system 100 implements a serializer/deserializer (SERDES) system which includes correction of pre-cursor and post-cursor ISI. As shown, the transceiver system 100 includes a transmitter (TX) 102 and a receiver (RX) 104. The transmitter 102 transmits an analog data signal 108 to receiver 104 over a channel 106, which can comprise a wire or wireless channel that permits communication of a signal. For example, the transmitter 102 may be part of a first microchip (e.g., a first application specific integrated circuit (ASIC)), the receiver 104 may be part of a second microchip (e.g., a second ASIC), and the channel 106 may comprise a conductive wire on a printed circuit board (PCB) coupling a pin of the first microchip and to a pin of the second microchip. In this example, the transmitter 102 and the receiver 104 can support a high-speed serial data link, between the first and second microchips, over the channel 106.

In FIG. 1, the transmitter 102 includes a serializer 122, a phase lock loop 124 that provides the serializer 122 with a clock signal 126 to facilitate operation of the serializer 122, and an output driver 128. The serializer 122 can receive input data 120 through a parallel data interface and serializes (e.g., compresses) the received input data 120 into a serial data signal (e.g., serial data stream) that can pass to the output driver 128. The output driver 128 can receive the serial data signal, convert the serial data signal to the analog data signal 108, and output the analog data signal 108. The analog data signal 108 (hereafter, "transmitted data signal 108") can be communicated over the channel 106 to the receiver 104.

The receiver 104 includes a receiver (RX) front-end 138, a decision feedback equalization (DFE) circuit 142 with pre-cursor and post-cursor ISI correction, a clock and data recovery (CDR) circuit 134, and a deserializer 132. The RX front-end 138 can receive the transmitted data signal 108, over the channel 106 from the transmitter 102, and amplify the signal appropriately. The amplified version of the transmitted data signal 108 can then be provided to the DFE circuit 142.

In accordance with various embodiments, the DFE circuit 142 implements a pre-cursor correction and post-cursor correction with respect to a data signal. The DFE circuit 142 can comprise circuitry for implementing non-linear equalization of the transmitted data signal 108 using a plurality of slicers and data bit feedback, which can correct for pre-cursor ISI and post-cursor ISI present in the transmitted data signal 108. The CDR circuit 134 extracts from the transmitted data signal 108 an embedded clock signal, which once recovered can be provided to the DFE circuit 142 and to the deserializer 132 for their respective operations. The DFE circuit 142 can use the recovered clock signal to sample the transmitted data signal 108 and retrieve individual data bits from the transmitted data signal 108. The deserializer 132 can receive the retrieved data bits from the DFE circuit 142 and deserialize (e.g., expand) the retrieved data bits into parallel data bits, which can constitute output data 136.

Figure 2:
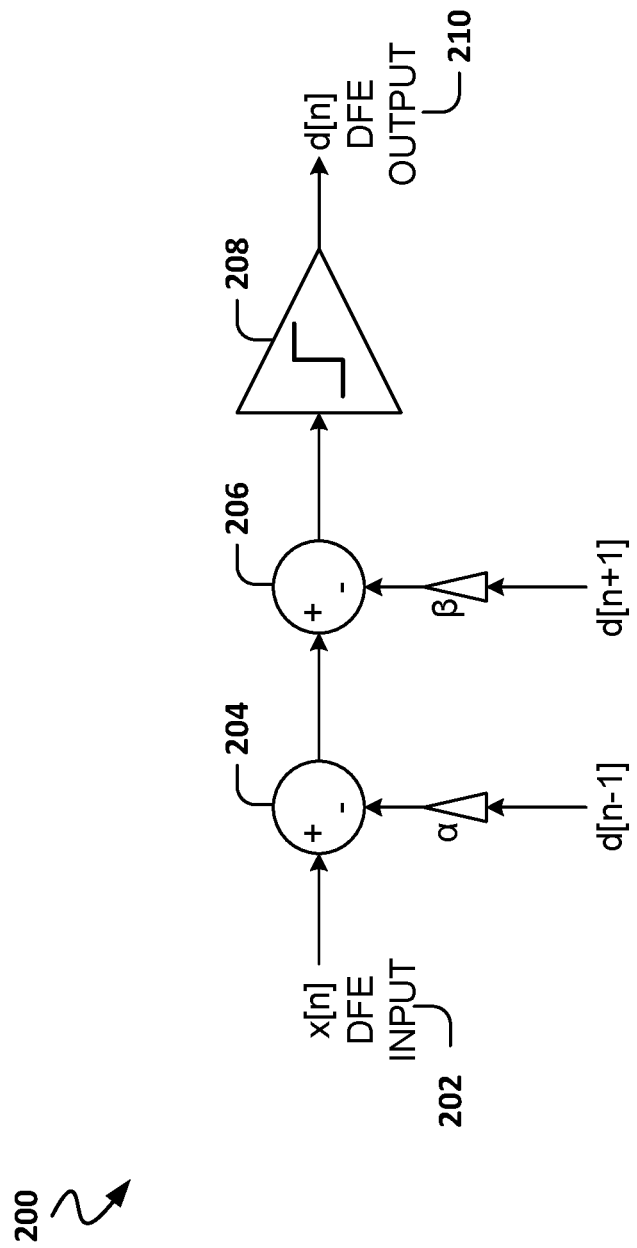
FIG. 2 is diagram illustrating an example decision feedback equalization (DFE) architecture for correcting pre-cursor and post-cursor ISI, according to some embodiments.

FIG. 2 is diagram illustrating an example DFE architecture 200 for correcting pre-cursor and post-cursor ISI, according to some embodiments. In particular, the DFE architecture 200 illustrates how a data bit d[n] at unit interval n is retrieved from a data signal x[n] at unit interval n represented by:

$$x[n]=d_i[n]+\alpha *d_i[n-1]+\beta *d_i[n+1]+s[n],$$

where $d_i[n-1]$ represents a transmitted data bit and $s[n]$ represents crosstalk and noise In FIG. 2, $d[n-1]$ represents a past data bit retrieved from the $x[n-1]$, $d[n+1]$ represents a next data bit retrieved from the $x[n+1]$, $\alpha$ represents a post-cursor amplitude, $\beta$ represents a pre-cursor amplitude, $\alpha *d[n-1]$ represents post-cursor ISI, $\beta *d[n+1]$ represents pre-cursor ISI. The DFE architecture 200 receives $x[n]$ as DFE input 202 and produces $d[n]$ as DFE output 210 by removing $\alpha *d[n-1]$ (at 204) and $\beta *d[n+1]$ (at 206) from $x[n]$, and then converting the resulting data signal to the data bit $d[n]$ using a slicer 208.

Figure 3:
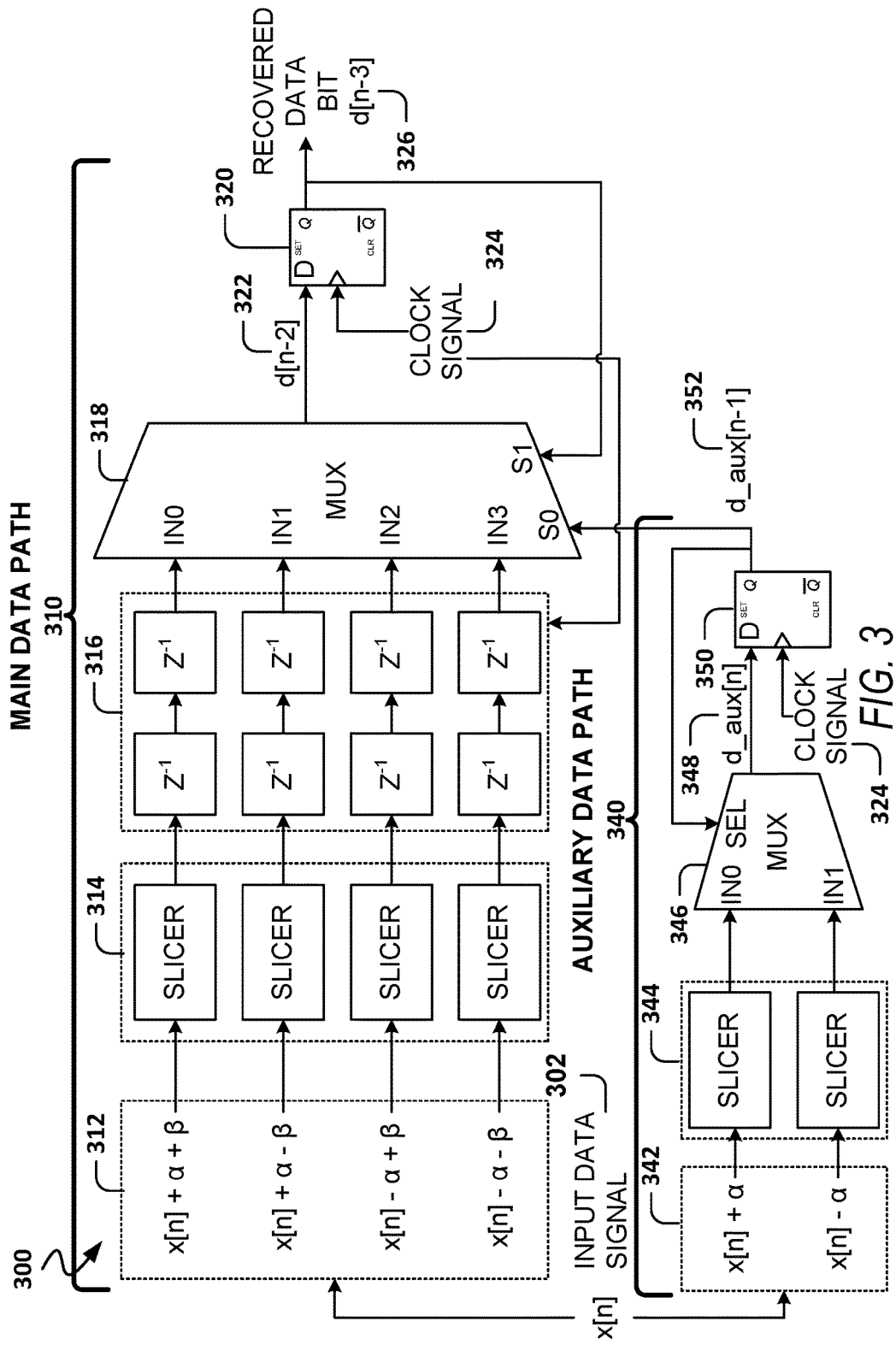
FIG. 3 is a diagram illustrating an example DFE that corrects for pre-cursor and post-cursor ISI, in accordance with some embodiments.

FIG. 3 is a diagram illustrating an example DFE 300 that corrects for pre-cursor and post-cursor ISI, in accordance with some embodiments. According to some embodiments, the DFE 300 implements a DFE that implements one-tap pre-cursor intersymbol interference correction and post-cursor intersymbol interference correction. Various embodiments described herein may be expanded to implement a two or more-tap pre-cursor intersymbol interference correction and post-cursor intersymbol interference correction. As shown, the DFE 300 comprises a main data path 310 and an auxiliary data path 340. The main data path 310 includes a plurality of addition circuits 312, a plurality of slicers 314, a plurality of digital flip-flops 316, a multiplexer 318, and a digital flip-flop 320. The plurality of addition circuits 312 is coupled to the plurality of slicers 314, the plurality of slicers 314 is coupled to the plurality of digital flip-flops 316, the plurality of digital flip-flops 316 is coupled to the multiplexer 318, and the multiplexer 318 coupled to digital flip-flop 320.

The auxiliary data path 340 comprises a plurality of addition circuits 342, a plurality of slicers 344, a multiplexer 346, and a digital flip-flop 350. The plurality of addition circuits 342 is coupled to the plurality of slicers 344, the plurality of slicers 344 is coupled to the multiplexer 346, and the multiplexer 346 coupled to the digital flip-flop 350.

A clock signal 324 is provided to various components of the DFE 300 for their respective operation, such as the plurality of digital flip-flops 316, the slicer 314, the digital flip-flop 320, the slicer 344, and the digital flip-flop 350. The clock signal 324 may be provided by a component external the DFE 300, such as a CDR circuit (e.g., 134) of a receiver.

During operation, the DFE 300 receives an input (analog) data signal x[n] (302) at time interval n, which is provided to the main data path 310 and to the auxiliary data path 340. As shown, the auxiliary data path 340 receives the input data signal 302 and retrieves, from the input data signal 302, a data bit d_aux[n−1] (352) retrieved from the input data signal at time interval n−1. In the context of the DFE 300, the data bit 352 can represent the estimated next data bit retrieved by the auxiliary data path 340. In parallel, the main data path 310 receives the input data signal 302 and retrieves, from the input data signal 302, a data bit d[n−3] (326) based on the data bit 352 provided by the auxiliary data path 340. In the context of the DFE 300, the data bit 326 can represent a data bit recovered from the input data signal 302 by the DFE 300 and then outputted by the DFE 300 (e.g., provided to next receiver components, such as a deserializer).

With respect to the auxiliary data path 340, the plurality of addition circuits 342 receive the input data signal 302 and apply a plurality of voltage offsets to the input data signal 302 to generate a plurality of input data signals. The plurality of voltage offsets (e.g., +α and −α) may be associated with correction for post-cursor ISI and, as such, the plurality of input data signals represents all possible combinations of the post-cursor ISI present in the input data signal 302. According to various embodiments, at least one of the signals, in the plurality of input signal generated by the plurality of addition circuits 342, represents the input data signal 302 with the post-cursor ISI removed. For some embodiments, the plurality of addition circuits 342 comprise a plurality of comparison circuits (e.g., comparators), each of which can add an offset voltage to a signal received by the plurality of addition circuits 342. As shown, the plurality of input signals is outputted by the plurality of addition circuits 342 as parallel signals that output into the plurality of slicers 344. As noted herein, some embodiments may be implemented using plurality of different slicer (e.g., comparator) thresholds corresponding to pre and post-cursors, thereby obviating the need for a plurality of different voltage shifts.

The plurality of slicers 344 can receive the plurality of input data signals, which are analog, and convert each of the plurality of input data signals into a corresponding data bit at time interval n, thereby generating a plurality of data bits at time interval n. For some embodiments, each slicer can quantize an analog signal to a candidate signal level (e.g., one of two signal levels) that represents a binary value of a data bit. As shown, the plurality of slicers 344 are configured to receive the plurality of input data signal (from the plurality of addition circuits 342) in parallel, and output the plurality of data bits into the multiplexer 346.

The multiplexer 346 receives the plurality of data bits (from the plurality of slicers 344) in parallel and selects one of the plurality of data bits as its output, where the output represents a data bit d_aux[n] (348) at time interval n retrieved from the input data signal 302. As shown, the multiplexer 346 selects one of the plurality of data bits based on the data bit d_aux[n−1] (352) being outputted and fed back to the multiplexer 346 from the digital flip-flop 350 of the auxiliary data path 340. According to some embodiments, the multiplexer 346 selects one of the plurality of data bits in accordance with Table 3 (below).

TABLE 3

| d_aux[n − 1] (352) | Signal at Slicers (344) | d_aux[n] (348) (i.e., Signal at Slicer Output) |
|---|---|---|
| −1 (Logic low) | x[n] + α | sgn(x[n] + α) |
| 1 (Logic high) | x[n] − α | sgn(x[n] − α) |

The digital flip-flop 350 receives, from the multiplexer 346, the data bit d_aux[n] (348) at time interval n, delays the data bit 348 by one time interval, and outputs the data bit d_aux[n−1] (352) at time interval n−1. As described herein, the data bit 352 may be considered an estimated next data bit because the next data bit comprises a data bit retrieved from the received data signal with post-cursor ISI correction applied (by the auxiliary data path 340) but not pre-cursor ISI correction. The data bit 352 is provided to the main data path 310 and, more specifically, received by the multiplexer 318 of the main data path 310.

With respect to the main data path 310, the plurality of addition circuits 342 receive the input data signal 302 and apply a plurality of voltage offsets to the input data signal 302 to generate a plurality of input data signals. The plurality of voltage offsets (e.g., +α+β, −α+β, −α+β, +α−β) may be associated with correction for pre-cursor ISI and post-cursor ISI and, as such, the plurality of input data signals represents all possible combinations of the pre-cursor ISI and post-cursor ISI present in the input data signal 302. According to various embodiments, at least one of the signals, in the plurality of input signals generated by the plurality of addition circuits 312, represents the input data signal 302 with both the pre-cursor ISI and post-cursor ISI removed. For some embodiments, the plurality of addition circuits 312 comprise a plurality of comparison circuits (e.g., comparators), each of which can add an offset voltage to a signal received by the plurality of addition circuits 312. As shown, the plurality of input signals is outputted by the plurality of addition circuits 312 as parallel signals that output into the plurality of slicers 314.

The plurality of slicers 314 can receive the plurality of input data signals, which are analog, and convert each of the plurality of input data signals into a corresponding data bit at time interval n, thereby generating a plurality of data bits at time interval n. For some embodiments, each slicer can quantize an analog signal to a candidate signal level (e.g., one of two signal levels) that represents a binary value of a data bit. As shown, the plurality of slicers 314 are configured to receive the plurality of input data signal (from the plurality of addition circuits 312) in parallel, and outputs the plurality of data bits into the plurality of digital flip-flops 316.

The plurality of digital flip-flops 316 receives the plurality of data bits (from the plurality of slicers 314) in parallel, delays each of the data bits by two time intervals, and outputs the delayed data bits in parallel to the multiplexer 318. According to some embodiments, by delaying the data bits by two time intervals, so that the auxiliary data path 340 can determine (e.g., estimate) the next data bit d[n−1] 352 relative to the data bit d[n−2] 322, which the main data path 310 uses to correct (e.g., remove) pre-cursor ISI and post-cursor ISI in the data bit d[n−2] 322. Post-cursor ISI in the data bit d[n−2] may be corrected based on the previous recovered bit d[n−3] in the main data path 310. For some embodiments, the DFE 300 is extended to correct for multiple pre and post-cursors. For other embodiments, a DFE comprises k auxiliary data paths and a main data path that delays the plurality of data bits by k+1 time intervals such that each auxiliary data path determines a next data bit corresponding to a different pre-cursor at time interval n-k. For some embodiments, the k auxiliary data paths can be combined to obtain k pre-cursor components. In this way, such embodiments can correct for ISI in the main data path at k different pre-cursors.

The multiplexer 318 receives the plurality of data bits (from the plurality of digital flip-flops 316) in parallel and selects one of the plurality of data bits as its output, where the output represents a data bit d[n−2] (322) retrieved from the input data signal 302. As shown, the multiplexer 318 selects one of the plurality of data bits based on the data bit d[n−3] (326) being outputted by the digital flip-flop 320 (of the main data path 310) and based on the data bit d_aux[n−1] (352) being provided by the auxiliary data path 340. According to some embodiments, the multiplexer 318 selects one of the plurality of data bits in accordance with Table 4 (below).

TABLE 4

| d_aux[n − 1] (352) to S0 | d[n − 3] (326) to S1 | Signal at Slicers (314) | d[n − 2] (322) (i.e., Signal at Slicer Output) |
|---|---|---|---|
| −1 (Logic low) | −1 (Logic low) | $x[n] + \alpha + \beta$ | $sgn(x[n] + \alpha + \beta)$ |
| −1 (Logic low) | 1 (Logic high) | $x[n] + \alpha - \beta$ | $sgn(x[n] + \alpha - \beta)$ |
| 1 (Logic high) | −1 (Logic low) | $x[n] - \alpha + \beta$ | $sgn(x[n] - \alpha + \beta)$ |
| 1 (Logic high) | 1 (Logic high) | $x[n] - \alpha - \beta$ | $sgn(x[n] - \alpha - \beta)$ |

The digital flip-flop 350 receives, from the multiplexer 346, the data bit d_aux[n] (348) at time interval n, delays the data bit 348 by one time interval, and outputs the data bit d_aux[n−1] (352). As described herein, the data bit 352 may be considered an estimated next data bit because the next data bit comprises a data bit retrieved from the received data signal with post-cursor ISI correction applied (by the auxiliary data path 340) but not pre-cursor ISI correction. The data bit 352 is provided to the main data path 310 and, more specifically, received by the multiplexer 318 of the main data path 310.

Figure 4:
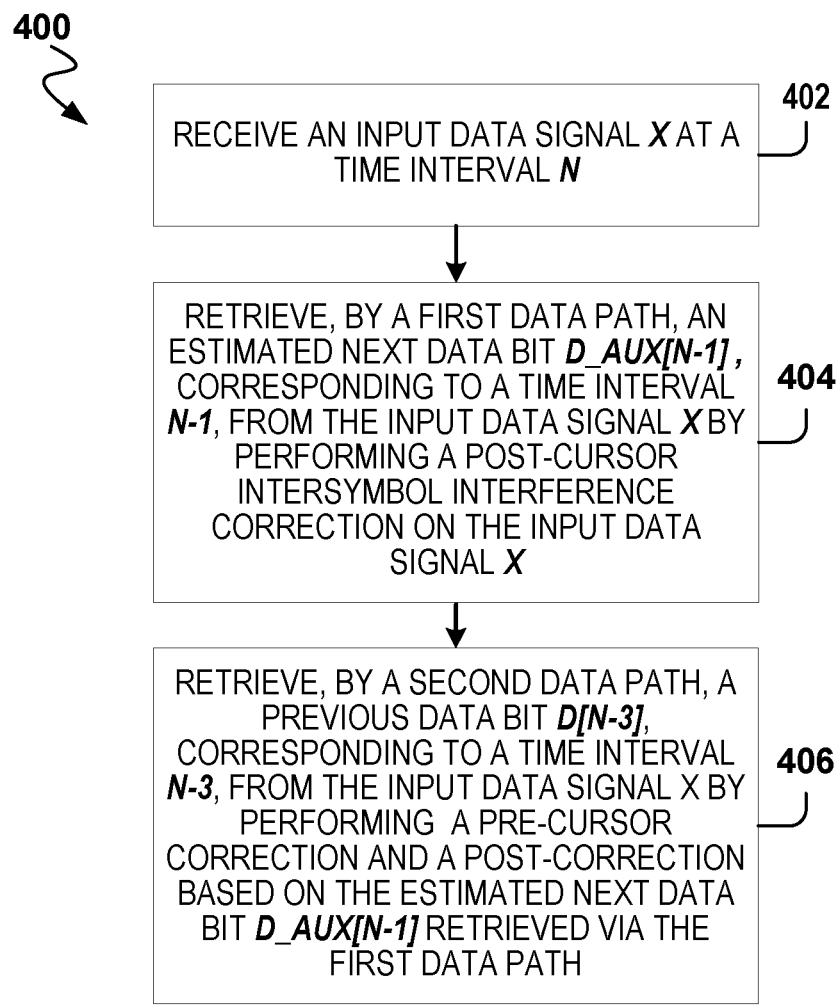
FIG. 4 is a flowchart illustrating an example method for correcting for pre-cursor and post-cursor intersymbol interference, according to some embodiments.

FIG. 4 is a flowchart illustrating an example method 400 for correcting for pre-cursor and post-cursor intersymbol interference, according to some embodiments. It will be understood that example methods described herein may be performed by various circuit components, including for example addition circuits, comparators, slicers, digital flip-flops, multiplexers, and the like. For instance, the method 400 may be performed by the DFE 300 described herein with respect to FIG. 3. Depending on the embodiment, an operation of an example method described herein may involve intervening operations not shown. Additionally, though the operations of example methods may be depicted and described in a certain order, the order in which the operations are performed may vary among embodiments, including performing certain operations in parallel. For some embodiments, the method 400 may be implemented using plurality of different slicer (e.g., comparator) thresholds corresponding to pre and post-cursors, thereby obviating the need for a plurality of different voltage shifts.

The method 400 as illustrated begins with operation 402 (e.g., the DFE 300) receiving an (analog) input data signal x (e.g., 302) at a time interval n. As described herein, the input data signal x may represent a data signal received over a communications channel from a transceiver. Additionally, according to some embodiments, the input data signal x carries a stream of data, from which data bits may be retrieved.

The method 400 continues with operation 404 retrieving, by a first data path (e.g., the auxiliary data path 340) comprising a first plurality of circuit components, an estimated next data bit d_aux[n−1] (e.g., 352) corresponding to a time interval n−1 from the input data signal x. According to some embodiments, this may comprise performing a post-cursor ISI correction on the input data signal x. As described herein, the post-cursor ISI correction may comprise a one-tap post-cursor ISI correction. For some embodiments, the method 400 can be extended to multi-tap post cursor ISI correction.

For some embodiments, retrieving the estimated next data bit d_aux [n−1] from the input data signal x by performing the post-cursor intersymbol interference correction on the input data signal x comprises generating, by a plurality of addition circuits (e.g., 342), a plurality of input data signals by applying a plurality of voltage shifts to the input data signal x. The plurality of voltage shifts may correspond to post-cursor intersymbol interference. By a plurality of slicers (e.g., 344), the plurality of input data signals may be converted to a plurality of data bits corresponding to the plurality of input data signals. By a multiplexer (e.g., 346), a particular data bit, from the plurality of data bits, may be selected based on the estimated next data bit d_aux [n−1] provided by a digital flip-flop (e.g., 350). The particular data bit may comprise a data bit d[n] corresponding to a time interval n. By the digital flip-flop (e.g., 350), the data bit d_aux[n] may be delayed by one time interval to produce the estimated next data bit d_aux[n−1].

The method 400 continues with operation 406 retrieving, by a second data path (e.g., the main data path 310) comprising a second plurality of circuit components, a previous data bit d[n−3] (e.g., 326) corresponding to a time interval n−3 from the input data signal x. According to some embodiments, this may comprise performing a pre-cursor correction and a post-cursor ISI correction on the input data signal x based on the estimated next data bit d_aux[n−1] retrieved via the first data path. The previous data bit d[n−3] (e.g., 326) may represent a data bit recovered and outputted by the method 400.

For some embodiments, retrieving the previous data bit d[n−3] from the input data signal x based on the estimated next data bit d_aux[n−1] comprises generating, by a plurality of addition circuits (e.g., 312), a plurality of input data signals by applying a plurality of voltage shifts to the input data signal x. The plurality of voltage shifts may correspond to pre-cursor intersymbol interference and post-cursor intersymbol interference. By a plurality of slicers (e.g., 314), the plurality of input data signals may be converted to a first plurality of data bits corresponding to the plurality of input data signals. By a plurality of digital flip-flops (e.g., 316), the first plurality of data bits may be delayed by at least two time intervals to produce a second plurality of data bits. By a multiplexer (e.g., 318), a particular data bit, from the second plurality of data bits, may be selected based on the previous data bit d[n−3] provided by a digital flip-flop (e.g., 320) and based on the estimated next data bit d_aux[n−1] (e.g., 352) provided by the first data path (e.g., 340), where the particular data bit comprises a data bit d[n−2] (e.g., 322) corresponding to a time interval n−2. By the digital flip-flop (e.g., 320), the data bit d[n−2] (e.g., 322) may be delayed by one time interval to produce the previous data bit d[n−3] (e.g., 326).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A circuit comprising:
    a first data path comprising a first plurality of circuit components, the first data path receiving an input data signal x at time interval n and retrieving, from the input data signal x, an estimated next data bit d_aux[n−1] corresponding to a time interval n−1 wherein the first plurality of circuit components comprising:
        a plurality of addition circuits to apply a plurality of voltage offsets, associated with correction for post-cursor intersymbol interference, to the input data signal x received at the time interval n to generate a plurality of input data signals corresponding to the time interval n;
        a plurality of slicers to convert the plurality of input data signals to a plurality of data bits that correspond to the plurality of input data signals;
        a multiplexer to receive the plurality of data bits and select a particular data bit, from the plurality of data bits, as output of the multiplexer, the particular data bit comprising a data bit d[n] corresponding to the time interval n, the particular data bit being selected by the multiplexer based on the estimated next data bit d_aux[n−1] provided by a digital flip-flop included in the first plurality of circuit components; and
        the digital flip-flop to receive the particular data bit from the output of the multiplexer and delay the data bit d[n] to produce the estimated next data bit d_aux[n−1]; and
    a second data path comprising a second plurality of circuit components, the second data path receiving the input data signal x at the time interval n and retrieving, from the input data signal x, a previous data bit d[n−1] corresponding to a time interval n−1 based on the estimated next data bit retrieved by the first data path.

2. The circuit of claim 1, wherein the retrieving the estimated next data bit d_aux[n−1] comprises performing a one-tap post-cursor intersymbol interference correction on the input data signal x.

3. The circuit of claim 1, wherein the plurality of input data signals comprises x[n]+α and x[n]−α, and wherein α represents a post-cursor of a pulse of the input data signal x at the time interval n.

4. The circuit of claim 1, wherein the second plurality of circuit components comprises:
    a plurality of addition circuits to apply a plurality of voltage offsets, associated with correction for pre-cursor intersymbol interference and post-cursor intersymbol interference, to the input data signal x at the time interval n to generate a plurality of input data signals corresponding to the time interval n;
    a plurality of slicers to convert the plurality of input data signals to a first plurality of data bits that correspond to the plurality of input data signals;
    a plurality of digital flip-flops to receive the first plurality of data bits and delay the first plurality of data bits by two time intervals to generate a second plurality of data bits corresponding to a time interval n−2;
    a multiplexer to receive the second plurality of data bits and select a second particular data bit, from the second plurality of data bits, as output of the multiplexer, the second particular data bit comprising a data bit d[n−2] corresponding to the time interval n−2, the second particular data bit being selected by the multiplexer based on a previous data bit d[n−3] provided by a digital flip-flop included in the second plurality of circuit components and based on the estimated next data bit d_aux[n−1] provided by the first data path, wherein selection of the second particular data bit by the multiplexer based on the previous data bit d[n−3]

determines the selection of the particular data bit with respect to post-cursor intersymbol interference correction; and the digital flip-flop to receive the data bit d[n−2] from the output of the multiplexer and delay the data bit d[n−2] to produce the previous data bit d[n−3].

5. The circuit of claim 1, wherein the second plurality of circuit components comprises:

a plurality of addition circuits to apply a plurality of voltage offsets, associated with correction for pre-cursor intersymbol interference and post-cursor intersymbol interference, to the input data signal x at the time interval n to generate a plurality of input data signals corresponding to the time interval n;

a plurality of slicers to convert the plurality of input data signals to a first plurality of data bits that correspond to the plurality of input data signals;

a plurality of digital flip-flops to receive the first plurality of data bits and delay the first plurality of data bits by two time intervals to generate a second plurality of data bits corresponding to a time interval n−2;

a multiplexer to receive the second plurality of data bits and select a second particular data bit, from the second plurality of data bits, as output of the multiplexer, the second particular data bit comprising a data bit d[n−2] corresponding to the time interval n−2, the second particular data bit being selected by the multiplexer based on a previous data bit d[n−3] provided by a digital flip-flop included in the second plurality of circuit components and based on the estimated next data bit d_aux[n−1] provided by the first data path, selection of the second particular data bit by the multiplexer based on the estimated next data bit d_aux[n−1] determines the selection of the particular data bit with respect to pre-cursor intersymbol interference correction; and the digital flip-flop to receive the data bit d[n−2] from the output of the multiplexer and delay the data bit d[n−2] to produce the previous data bit d[n−3].

6. The circuit of claim 1, wherein the circuit is included by a decision feedback equalizer (DFE) circuit.

7. The circuit of claim 1, wherein the circuit is included by a serializer/deserializer (serdes) system.

8. A circuit comprising:

a first data path that receives an input data signal x and retrieves an estimated next data bit from the input data signal x, the first data path comprising:

a first plurality of addition circuits to apply a first plurality of voltage offsets, associated with correction for post-cursor intersymbol interference, to the input data signal x to generate a first plurality of input data signals;

a first plurality of slicers to convert the first plurality of input data signals to a first plurality of data bits;

a first multiplexer to receive the first plurality of data bits and select a first particular data bit, from the first plurality of data bits, as output of the first multiplexer, the first particular data bit being selected by the first multiplexer based on the estimated next data bit provided by a first digital flip-flop of the first data path; and the first digital flip-flop to delay the first particular data bit received from the output of the first multiplexer and output the estimated next data bit; and a second data path that receives the input data signal x and retrieves a retrieved data bit from the input data signal x based on the estimated next data bit provided by the first data path, the second data path comprising:

a second plurality of addition circuits to apply a second plurality of voltage offsets, associated with correction for pre-cursor intersymbol interference and post-cursor intersymbol interference, to the input data signal x to generate a second plurality of input data signals;

a second plurality of slicers to convert the second plurality of input data signals to a second plurality of data bits;

a second plurality of digital flip-flops to delay the second plurality of data bits by at least two time intervals to generate a third plurality of data bits;

a second multiplexer to receive the third plurality of data bits and select a second particular data bit, from the third plurality of data bits, as output of the second multiplexer, the second particular data bit being selected by the second multiplexer based on a previous data bit provided by a second digital flip-flop of the second data path and based on the estimated next data bit provided by the first data path; and the second digital flip-flop to delay the second particular data bit received from the output of the second multiplexer and output the previous data bit, the retrieved bit comprising the previous data bit.

9. The circuit of claim 8, wherein the first plurality of input data signals comprises $x[n]+\alpha$ and $x[n]-\alpha$, and wherein $\alpha$ represents a post-cursor of a pulse of the input data signal x at a time interval n.

10. The circuit of claim 8, wherein the second plurality of input data signals comprises $x[n]+\alpha-\beta$, $x[n]-\alpha-\beta$, $x[n]+\alpha+\beta$, and $x[n]-\alpha+\beta$, wherein $\alpha$ represents a post-cursor of a pulse of the input data signal x at a time interval n, and wherein $\beta$ represents a pre-cursor of a pulse of the input data signal x at the time interval n.

11. The circuit of claim 8, wherein the circuit is included by a decision feedback equalizer (DFE) circuit.

12. The circuit of claim 8, wherein the circuit is included by a serializer/deserializer (serdes) system.

13. A method comprising:

receiving an input data signal x at a time interval n;

retrieving, by a first data path comprising a first plurality of circuit components, an estimated next data bit d_aux[n−1] corresponding to a time interval n−1 from the input data signal x by performing a post-cursor intersymbol interference correction on the input data signal x; and retrieving, by a second data path comprising a second plurality of circuit components, a previous data bit d[n−3] corresponding to a time interval n−3 from the input data signal x by performing a pre-cursor correction and a post-cursor ISI correction on the input data signal x based on the estimated next data bit d_aux[n−1] retrieved via the first data path, wherein the retrieving the previous data bit d[n−3] from the input data signal x based on the estimated next data bit d_aux[n−1] comprises:

generating, by a plurality of addition circuits, a plurality of input data signals by applying a plurality of voltage shifts to the input data signal x, the plurality of voltage shifts corresponding to pre-cursor intersymbol interference and post-cursor intersymbol interference;

converting, by a plurality of slicers, the plurality of input data signals to a first plurality of data bits corresponding to the plurality of input data signals;

delaying, by a plurality of digital flip-flops, the first plurality of data bits by at least two time intervals to produce a second plurality of data bits;

selecting, by a multiplexer, a particular data bit from the second plurality of data bits based on the previous data bit d[n−3] provided by a digital flip-flop and based on the estimated next data bit d_aux[n−1] provided by the first data path, the particular data bit comprising a data bit d[n−2] corresponding to a time interval n−2; and delaying, by the digital flip-flop, the data bit d[n−2] by one time interval to produce the previous data bit d[n−3].

14. The method of claim 13, wherein the retrieving the estimated next data bit d_aux[n−1] from the input data signal x by performing the post-cursor intersymbol interference correction on the input data signal x comprises:

generating, by a second plurality of addition circuits, a second plurality of input data signals by applying a second plurality of voltage shifts to the input data signal x, the second plurality of voltage shifts corresponding to post-cursor intersymbol interference;

converting, by a second plurality of slicers, the second plurality of input data signals to a second plurality of data bits corresponding to the second plurality of input data signals;

selecting, by a second multiplexer, a second particular data bit from the second plurality of data bits based on the estimated next data bit d_aux[n−1] provided by a second digital flip-flop, the second particular data bit comprising a data bit d[n] corresponding to the time interval n; and delaying, by the second digital flip-flop, the data bit d[n] by one time interval to produce the estimated next data bit d_aux[n−1].

15. The method of claim 13, the method being performed by a decision feedback equalizer (DFE) circuit.

16. The method of claim 13, the method being performed within a serializer/deserializer (serdes) system.

* * * * *